(12) United States Patent
Wise

(10) Patent No.: US 11,716,521 B2
(45) Date of Patent: Aug. 1, 2023

(54) USING IR SENSOR WITH BEAM SPLITTER TO OBTAIN DEPTH

(71) Applicants: Sony Group Corporation, Tokyo (JP); Sony Pictures Entertainment Inc., Culver City, CA (US)

(72) Inventor: Joseph Wise, Los Angeles, CA (US)

(73) Assignees: Sony Group Corporation, Tokyo (JP); Sony Pictures Entertain Inc., Culver City, CA (US)

( * ) Notice: Subject to any disclaimer, the term of this patent is extended or adjusted under 35 U.S.C. 154(b) by 0 days.

(21) Appl. No.: 17/036,876

(22) Filed: Sep. 29, 2020

(65) Prior Publication Data

US 2021/0185247 A1 Jun. 17, 2021

Related U.S. Application Data

(60) Provisional application No. 62/947,765, filed on Dec. 13, 2019.

(51) Int. Cl.
*G01S 17/894* (2020.01)
*H04N 23/11* (2023.01)
*G02B 27/10* (2006.01)
*H04N 23/16* (2023.01)

(52) U.S. Cl.
CPC ............ *H04N 23/11* (2023.01); *G01S 17/894* (2020.01); *G02B 27/1013* (2013.01); *H04N 23/16* (2023.01)

(58) Field of Classification Search
CPC ...... H04N 5/332; H04N 9/097; G01S 17/894; G02B 27/1013
USPC ........................................................ 348/164
See application file for complete search history.

(56) References Cited

U.S. PATENT DOCUMENTS

| | | | |
|---|---|---|---|
| 9,188,662 B2 | 11/2015 | You et al. | |
| 2010/0302376 A1 | 12/2010 | Boulanger et al. | |
| 2012/0105594 A1* | 5/2012 | You | G01S 7/4811 348/49 |
| 2018/0255250 A1* | 9/2018 | Price | A61B 3/113 |
| 2018/0278857 A1 | 9/2018 | Ohishi et al. | |
| 2020/0120291 A1* | 4/2020 | Cai | H04N 5/2256 |

* cited by examiner

*Primary Examiner* — Nguyen T Truong
(74) *Attorney, Agent, or Firm* — Procopio, Cory, Hargreaves & Savitch LLP

(57) ABSTRACT

Obtaining depth information using an IR sensor with a beam splitter including illuminating a subject with IR light using an IR light source; receiving reflected light including visible light and the IR light at a beam splitter; splitting the reflected light into two identical beams, a first beam and a second beam, using the beam splitter; receiving and processing the first beam at an IR sensor to pass the IR light and to block the visible light, to generate an IR image; receiving and processing the second beam at a visible light sensor to pass the visible light and to block the IR light, to generate a visible light image; and using a time of flight of the IR light transmitted by the IR light source and received by the IR sensor to calculate a distance of the subject from the beam splitter.

10 Claims, 3 Drawing Sheets

USING IR SENSOR WITH BEAM SPLITTER TO OBTAIN DEPTH

CROSS-REFERENCE TO RELATED APPLICATIONS

This application claims the benefit of priority under 35 U.S.C. § 119(e) of U.S. Provisional Patent Application No. 62/947,765, filed Dec. 13, 2019, entitled "Beam Splitter with IR Sensor." The disclosure of the above-referenced application is incorporated herein by reference.

BACKGROUND

Field

The present disclosure relates to optical apparatus, and more specifically, to using an infra-red (IR) sensor with a beam splitter to obtain depth information.

Background

In video production, it is important to synchronize the data collected from the cameras and sensors. The collected data may be synchronized using the positions of the cameras and sensors. However, calibrating the cameras and sensors to control the positions can be difficult.

SUMMARY

The present disclosure provides for obtaining depth information using an IR sensor with a beam splitter.

In one implementation, a system is disclosed. The system includes: an IR light source to illuminate a subject with IR light; a beam splitter to receive a beam of visible light and IR light reflected by the subject, the beam splitter to split the beam of visible light and IR light into two identical beams, a first beam and a second beam; an IR sensor coupled to the beam splitter, the IR sensor to receive and process the first beam to pass the IR light and to block the visible light to generate an IR image, wherein the IR light source is coupled to the IR sensor such that a time of flight of the IR light illuminated by the IR light source and received by the IR sensor is used to calculate a distance of the subject from the beam splitter; and a visible light sensor coupled to the beam splitter, the visible light sensor to receive and process the second beam to pass the visible light and to block the IR light to generate a visible light image.

In one implementation, the system further includes a processor to receive and process the IR image from the IR sensor and the visible light image from the visible light sensor. In one implementation, the processor processes the visible light image to generate a 2-D image of the subject. In one implementation, the processor processes the IR image and the calculated distance to generate depth information for the 2-D image of the subject. In one implementation, the IR sensor is a time of flight sensor. In one implementation, the IR sensor includes the IR light source to operate as the time of flight sensor. In one implementation, the system further includes a visible light source including light from the natural environment to illuminate the subject.

In another implementation, a method is disclosed. The method includes: illuminating a subject with IR light using an IR light source; receiving reflected light including visible light and the IR light at a beam splitter; splitting the reflected light into two identical beams, a first beam and a second beam, using the beam splitter; receiving and processing the first beam at an IR sensor to pass the IR light and to block the visible light, to generate an IR image; receiving and processing the second beam at a visible light sensor to pass the visible light and to block the IR light, to generate a visible light image; and using a time of flight of the IR light transmitted by the IR light source and received by the IR sensor to calculate a distance of the subject from the beam splitter.

In one implementation, the method further includes processing the visible light image to generate a 2-D image of the subject. In one implementation, the method further includes processing the IR image and the calculated distance to generate depth information for the 2-D image of the subject. In one implementation, the method further includes illuminating the subject with visible light including light from the natural environment. In one implementation, the reflected light is formed as a beam of visible light and IR light.

In a further implementation, a non-transitory computer-readable storage medium storing a computer program to obtain depth information using an IR sensor with a beam splitter is disclosed. The computer program includes executable instructions that cause a computer to: command an IR light source to illuminate a subject with IR light; command a beam splitter to receive reflected light including visible light and the IR light; command the beam splitter to split the reflected light into two identical beams, a first beam and a second beam; command an IR sensor to process the first beam to pass the IR light and to block the visible light, to generate an IR image; command a visible light sensor to process the second beam to pass the visible light and to block the IR light, to generate a visible light image; and use a time of flight of the IR light transmitted by the IR light source and received by the IR sensor to calculate a distance of the subject from the beam splitter.

In one implementation, the computer program further includes executable instructions that cause the computer to: process the visible light image to generate a 2-D image of the subject. In one implementation, the computer program further includes executable instructions that cause the computer to: process the IR image and the calculated distance to generate depth information for the 2-D image of the subject. In one implementation, the computer program further includes executable instructions that cause the computer to: command a visible light source to illuminate the subject with visible light including light from the natural environment. In one implementation, the reflected light is formed as a beam of visible light and IR light.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

It is important to synchronize the data collected from the cameras and sensors in video production and/or studio environment. The collected data may be synchronized using the positions of the cameras and sensors. However, calibrating the cameras and sensors to control the positions can be difficult. For example, in using IR data from an IR sensor as depth information for visible light data from a visible light sensor, the positions of the two sensors (i.e., the IR sensor and the visible light sensor) need to be calibrated in order to synchronize the IR data with the visible light data.

Certain implementations of the present disclosure provide for systems and methods to capture video data of a subject using an infrared (IR) sensor and a visible light sensor (e.g., a red-green-blue (RGB) sensor) connected to a beam splitter which splits the input image into two identical images. Thus, the beam splitter provides an identical spatial perspective for the two images. Therefore, the identical spatial perspective for the two images obviates the need for the calibration of the positions of the two sensors.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a video system uses a beam splitter to split the beam two or more ways to a plurality of sensors, wherein each sensor is configured to filter the beam within a particular band of frequencies. In one example, a video system captures video data of a subject using an IR sensor and a visible light sensor connected to a beam splitter to split a beam (of visible light and IR ray) into two or more beams, wherein each of those beams comes from the same source. Thus, by connecting the IR sensor and the visible light sensor to a beam splitter, the IR sensor and the visible light sensor can receive the beam from the same source as though the visible light sensor and the IR sensor were at the same location.

Figure 1:
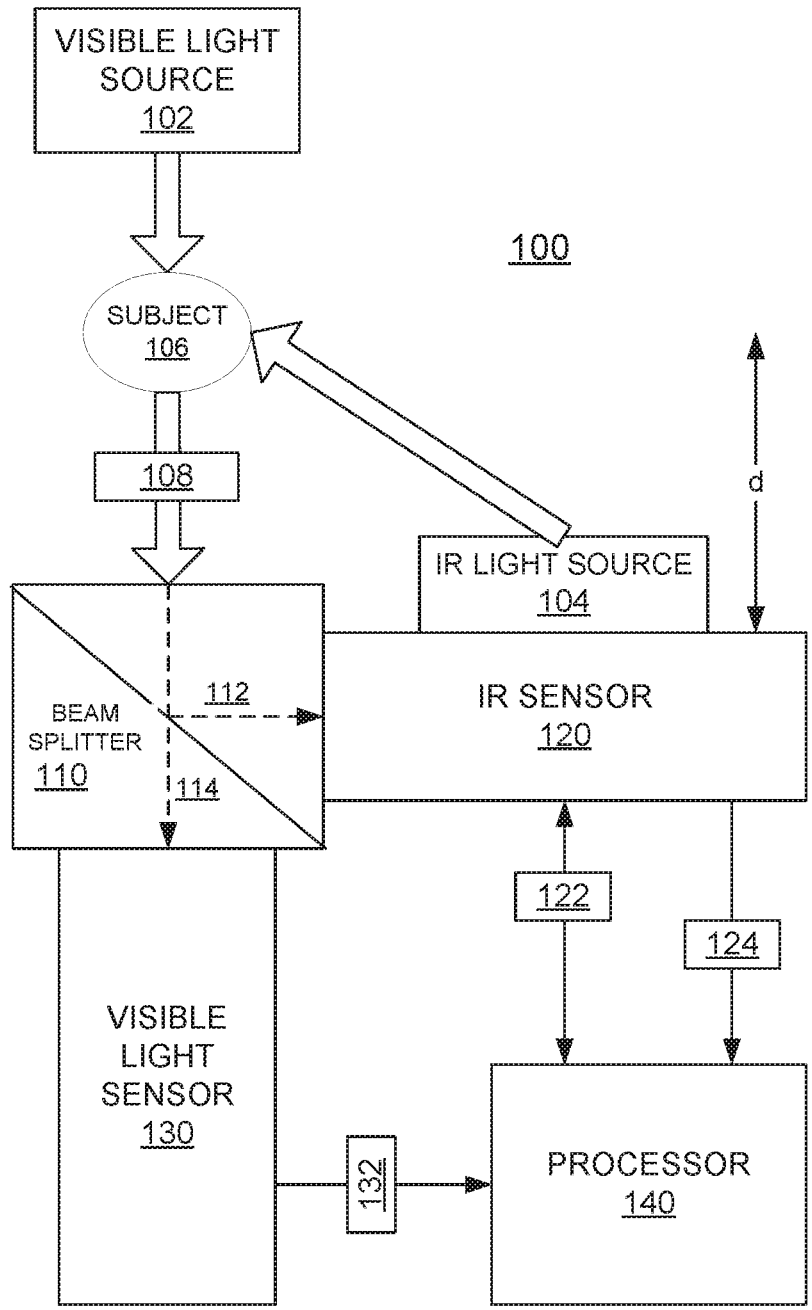
FIG. 1 is a block diagram of a video system for obtaining depth information using an IR sensor with a beam splitter in accordance with one implementation of the present disclosure.

FIG. 1 is a block diagram of a video system 100 for obtaining depth information using an IR sensor with a beam splitter in accordance with one implementation of the present disclosure. In FIG. 1, the video system 100 includes a beam splitter 110, an IR sensor 120, a visible light sensor 130, and a processor 140. The video system 100 may also include a visible light source 102 and an IR light source 104 to illuminate the subject 106, which reflects the beam of visible and IR light 108 toward the beam splitter. The visible light source 102 may include artificial light as well as light from the natural environment to shine onto the subject 106. In one implementation, the IR light source 104 is attached to or included in the IR sensor 120 to operate as a time of flight sensor, which measures the time it takes for the IR light to travel to the subject and back to the IR sensor 120. In one implementation, the IR sensor 120 and the visible light sensor 130 are coupled to the beam splitter 110.

In the illustrated implementation of FIG. 1, the subject 106 is illuminated by the visible light source 102 and the IR light source 104. The illuminated light may then be reflected toward the beam splitter 110 as the beam of visible and IR light 108. The beam splitter 110 receives the beam of visible and IR light 108 and splits the beam 108 into two identical beams and directs a first beam 112 toward the IR sensor 120 and a second beam 114 toward the visible light sensor 130.

The IR sensor 120 may receive and process the first beam 112 to pass the IR light and to block the visible light. The visible light sensor 130 may receive and process the second beam 114 to pass the visible light and to block the IR light. Thus, in one implementation, the IR sensor 120 transmits the IR image 124 to the processor 140 and the visible light sensor 130 transmits the visible light image 132 to the processor 140. As described above, the visible light image 132 and the IR image 124 have the identical spatial perspective since the images 132, 124 come from the same source (i.e., the beam splitter 110).

In one implementation, the processor 140 also communicates with the IR sensor 120 using messages 122 to measure and process the time of flight of the IR light transmitted by the IR light source 104 (of the IR sensor 120) and the first beam 112 received by the IR sensor 120. The processor 140 may calculate the distance (d) of the subject from the beam splitter 110 using the time of flight. The depth may then be derived from the calculated distance (d).

In one implementation, the processor 140 processes the visible light image 132 as a 2-D image of the subject 106, while the processor 140 processes the IR image 124 and the calculated distance (d) to provide depth information to the 2-D image.

Figure 2:
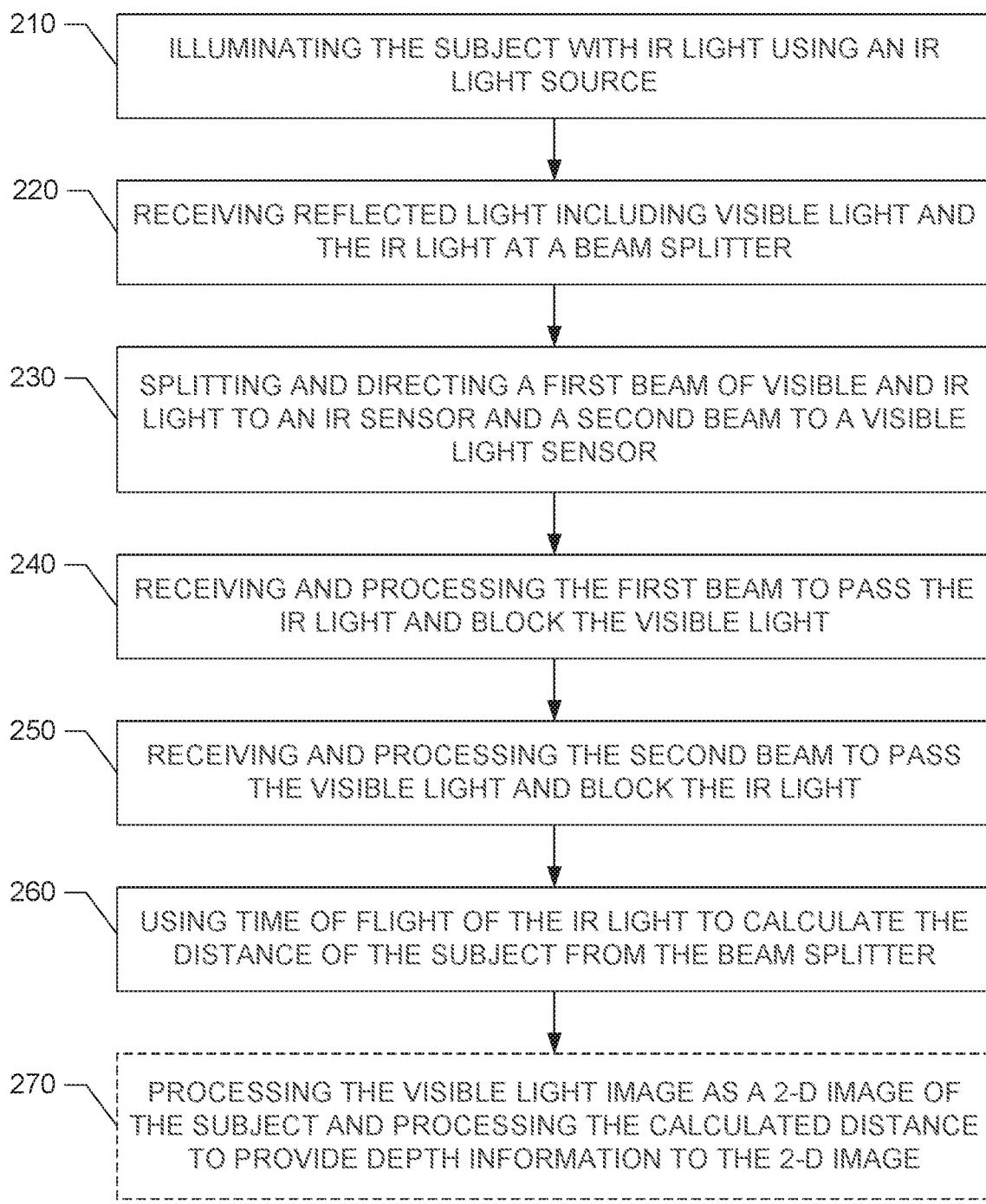
FIG. 2 is a flow diagram of a method for obtaining depth information using an IR sensor with a beam splitter in accordance with one implementation of the present disclosure.

FIG. 2 is a flow diagram of a method 200 for obtaining depth information using an IR sensor with a beam splitter in accordance with one implementation of the present disclosure. In FIG. 2, optional aspects are illustrated with a dashed line.

In the illustrated implementation of FIG. 2, a subject is illuminated with IR light using an IR light source, at step 210. In one implementation, the IR light source is coupled to or included in the IR sensor, and is configured as a time-of-flight sensor. In some implementations, the subject may also be illuminated with visible light either using the visible light source or from the natural environment. The illuminated light may then be reflected toward and received by a beam splitter, at step 220. The reflected light is formed as a beam of visible and IR light. The beam splitter then splits the beam of visible and IR light into two identical beams, and directs a first beam toward the IR sensor and a second beam toward the visible light sensor, at step 230.

The IR sensor receives and processes the first beam to pass the IR light and to block the visible light, at step 240. The visible light sensor receives and processes the second beam to pass the visible light and to block the IR light, at step 250. Thus, in one implementation, the IR sensor transmits the IR image for processing, while the visible light sensor transmits the visible light image for processing. As described above, the visible light image and the IR image have the identical spatial perspective since the images come from the same source.

A time of flight of the IR light transmitted by the IR light source and received by the IR sensor is then used to calculate the distance of the subject from the beam splitter, at step 260. In one implementation, the visible light image is processed as a 2-D image of the subject, while the calculated distance is processed to provide depth information to the 2-D image, at step 270.

Figure 3A:
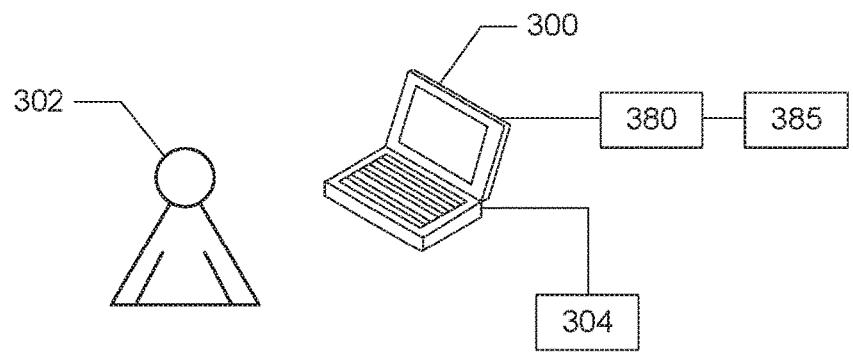
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an application 390 for obtaining depth information using an IR sensor with a beam splitter as illustrated and described with respect to the processor 140 in FIG. 1 and the method 200 in FIG. 2.

Figure 3B:
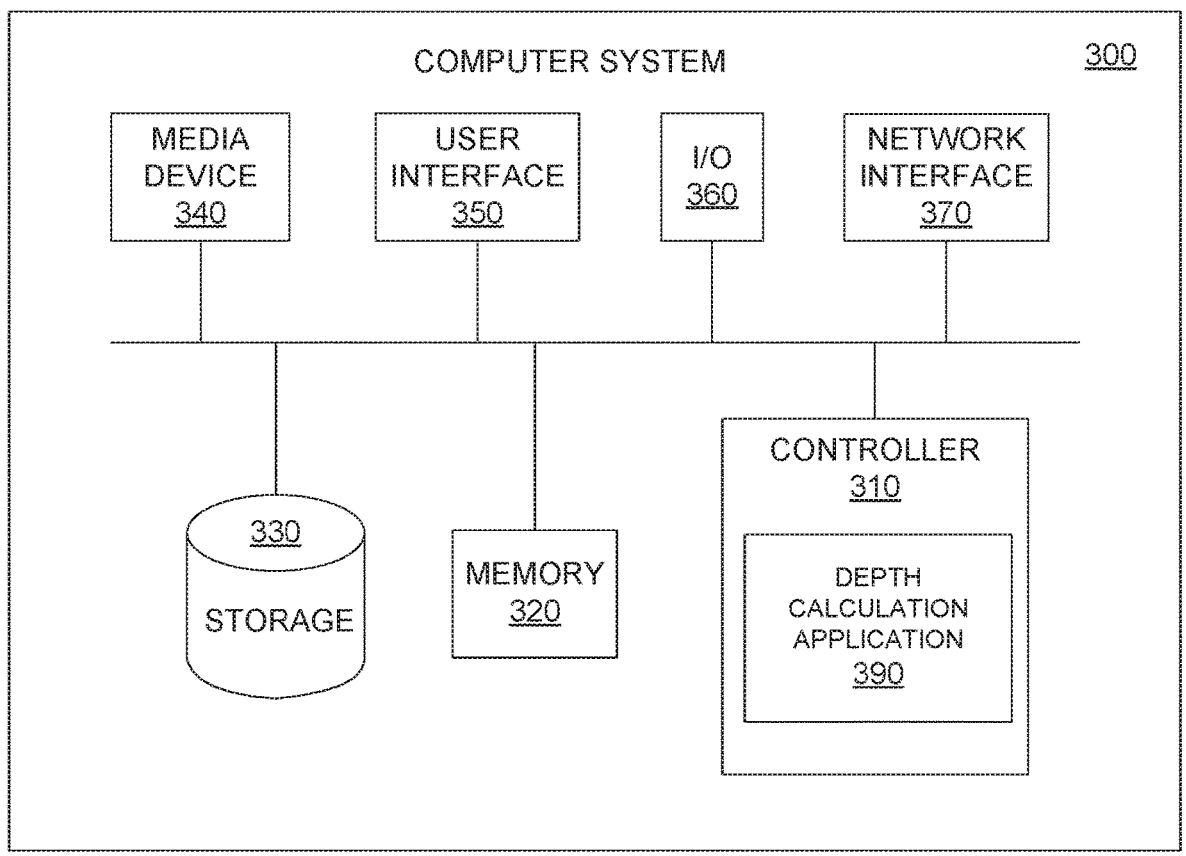
FIG. 3B is a functional block diagram illustrating the computer system hosting the depth calculation application in accordance with an implementation of the present disclosure.

The computer system 300 stores and executes the depth calculation application 390 of FIG. 3B. In addition, the computer system 300 may be in communication with a software program 304. Software program 304 may include the software code for the depth calculation application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the depth calculation application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the depth calculation application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing. In its execution, the controller 310 provides the depth calculation application 390 with a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the depth calculation application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Although the above description includes systems and methods for reducing the image circle in video production including the film production and the broadcast, the described systems and methods are applicable in other field such as in medical imaging.

Variations to the system are also possible. For example, in one implementation, the system includes multiple camera rigs, some or all of which have beam splitters. In another implementation, the system uses a beam splitter that splits light into three or more beams, each for a respective camera or sensor.

Additional variations and implementations are also possible. For example, in addition to video production for movies or television, implementations of the system and methods can be applied and adapted for other applications, such as virtual reality content, virtual production (e.g., virtual reality environments), or motion capture.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system comprising:
an infra-red (IR) light source to illuminate a subject with IR light;
a beam splitter to receive a beam of visible light and IR light reflected by the subject,
the beam splitter to split the beam into two identical beams, a first beam and a second beam, each of the first and second beams having the visible light and the IR light;
an IR sensor positioned next to the beam splitter, wherein the IR sensor is a time of flight sensor, the IR sensor to receive and process the first beam to pass the IR light and to block the visible light to generate an IR image, wherein the IR light source is positioned next to the IR sensor such that a time of flight of the IR light illuminated by the IR light source and received by the IR sensor is used to calculate a distance of the subject from the beam splitter;
a visible light sensor coupled to the beam splitter, the visible light sensor to receive and process the second beam to pass the visible light and to block the IR light to generate a visible light image;

a processor to receive and process the IR image from the IR sensor and the visible light image from the visible light sensor, wherein the processor processes the visible light image to generate a 2-D image of the subject, wherein the processor processes the IR image from the time of flight sensor and the calculated distance to generate depth information for the 2-D image of the subject, and wherein the beam splitter generates two identical beams, each beam having the visible light and the IR light, to provide an identical spatial perspective for the IR image and the visible light image such that positions of the IR sensor and the visible light sensor do not need to be calibrated, wherein having the identical spatial perspective for the IR image and the visible light image provides synchronization between the two images.

2. The system of claim 1, wherein the IR sensor is a time of flight sensor.

3. The system of claim 2, wherein the IR sensor includes the IR light source to operate as the time of flight sensor.

4. The system of claim 1, further comprising:
a visible light source including light from the natural environment to illuminate the subject.

5. A method comprising:
illuminating a subject with IR light using an IR light source;
positioning the IR light source next to an IR sensor;
receiving reflected light including visible light and the IR light at a beam splitter,
wherein the IR sensor is positioned next to the beam splitter;
splitting the reflected light into two identical beams, a first beam and a second beam, using the beam splitter, wherein each of the first and second beams has the visible light and the IR light;
receiving and processing the first beam at an IR sensor to pass the IR light and to block the visible light, to generate an IR image, wherein the IR sensor is a time of flight sensor;
receiving and processing the second beam at a visible light sensor to pass the visible light and to block the IR light, to generate a visible light image;
using a time of flight of the IR light transmitted by the IR light source and received by the IR sensor, which is connected to the IR sensor, to calculate a distance of the subject from the beam splitter;
processing the visible light image to generate a 2-D image of the subject;
processing the IR image from the time of flight sensor and the calculated distance to generate depth information for the 2-D image of the subject; and
wherein splitting the reflected light into two identical beams, each beam having the visible light and the IR light, provides an identical spatial perspective for the IR image and the visible light image such that positions of the IR sensor and the visible light sensor do not need to be calibrated, wherein having the identical spatial perspective for the IR image and the visible light image provides synchronization between the two images.

6. The method of claim 5, further comprising:
illuminating the subject with visible light including light from the natural environment.

7. The method of claim 5, wherein the reflected light is formed as a beam of visible light and IR light.

8. A non-transitory computer-readable storage medium storing a computer program to obtain depth information using an IR sensor with a beam splitter, the computer program comprising executable instructions that cause a computer to:
command an IR light source to illuminate a subject with IR light,
wherein the IR light source is positioned next to the IR sensor;
command a beam splitter to receive reflected light including visible light and the IR light;
command the beam splitter to split the reflected light into two identical beams, a first beam and a second beam, wherein the IR sensor is positioned next to the beam splitter;
command an IR sensor to process the first beam to pass the IR light and to block the visible light, to generate an IR image, wherein the IR sensor is a time of flight sensor;
command a visible light sensor to process the second beam to pass the visible light and to block the IR light, to generate a visible light image;
use a time of flight of the IR light transmitted by the IR light source and received by the IR sensor to calculate a distance of the subject from the beam splitter;
process the visible light image to generate a 2-D image of the subject; and
process the IR image from the time of flight sensor and the calculated distance to generate depth information for the 2-D image of the subject,
illuminating a subject with IR light using an IR light source;
connecting the IR light source to an IR sensor;
receiving reflected light including visible light and the IR light at a beam splitter;
splitting the reflected light into two identical beams, a first beam and a second beam, using the beam splitter, wherein each of the first and second beams has the visible light and the IR light;
receiving and processing the first beam at an IR sensor to pass the IR light and to block the visible light, to generate an IR image, wherein the IR sensor is a time of flight sensor;
receiving and processing the second beam at a visible light sensor to pass the visible light and to block the IR light, to generate a visible light image;
using a time of flight of the IR light transmitted by the IR light source and received by the IR sensor, which is connected to the IR sensor, to calculate a distance of the subject from the beam splitter;
processing the visible light image to generate a 2-D image of the subject;
processing the IR image from the time of flight sensor and the calculated distance to generate depth information for the 2-D image of the subject; and
wherein splitting the reflected light into two identical beams, each beam having the visible light and the IR light, provides an identical spatial perspective for the IR image and the visible light image such that positions of the IR sensor and the visible light sensor do not need to be calibrated, wherein having the identical spatial perspective for the IR image and the visible light image provides synchronization between the two images.

9. The non-transitory computer-readable storage medium of claim 8, further comprising executable instructions that cause the computer to:
   command a visible light source to illuminate the subject with visible light including light from the natural environment.

10. The non-transitory computer-readable storage medium of claim 8, wherein the reflected light is formed as a beam of visible light and IR light.

* * * * *